US012113304B2

(12) United States Patent
Hautcoeur et al.

(10) Patent No.: US 12,113,304 B2
(45) **Date of Patent: *Oct. 8, 2024**

(54) STACKED PATCH ANTENNA DEVICES AND METHODS

(71) Applicant: TALLYSMAN WIRELESS INC., Kanata (CA)

(72) Inventors: Julien Yannick Hautcoeur, Gatineau (CA); Gyles Panther, Ottawa (CA)

(73) Assignee: Tallysman Wireless Inc., Kanata (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/450,220

(22) Filed: Aug. 15, 2023

(65) Prior Publication Data

US 2023/0411854 A1 Dec. 21, 2023

Related U.S. Application Data

(63) Continuation of application No. 17/812,681, filed on Jul. 14, 2022, now Pat. No. 11,749,895, which is a continuation of application No. 16/943,209, filed on Jul. 30, 2020, now Pat. No. 11,417,961.

(60) Provisional application No. 62/880,237, filed on Jul. 30, 2019.

(51) Int. Cl.
*H01Q 9/04* (2006.01)
*H01Q 1/52* (2006.01)

(52) U.S. Cl.
CPC ........... *H01Q 9/0414* (2013.01); *H01Q 1/521* (2013.01); *H01Q 9/0485* (2013.01)

(58) Field of Classification Search
CPC ..... H01Q 9/0414; H01Q 1/521; H01Q 9/0485
See application file for complete search history.

(56) References Cited

U.S. PATENT DOCUMENTS 11,749,895 B2 * 9/2023 Hautcoeur ........... H01Q 9/0485 343/893
2010/0073236 A1 3/2010 Mierke et al.
2020/0251824 A1 8/2020 Monma et al.

FOREIGN PATENT DOCUMENTS

CN 101916901 A 12/2010

* cited by examiner

*Primary Examiner* — Dieu Hien T Duong
(74) *Attorney, Agent, or Firm* — Rosenberg, Klein & Lee

(57) ABSTRACT

A stacked patch antenna comprises two or more patch antennas physically disposed in a stack to provide a multi-frequency or broad band antenna. However, independence of the resonant response frequencies of the lower and upper patches of each stacked patch antenna pair ground requires metallization dimensions for the upper patch's lower surface be contained within the perimeter of the lower patch's resonant metallization. Accordingly, composite stacked patch element dimensions are limited by the desired resonant frequency of the lower patch. The inventors have established an alternate physical structure where the resonant patch geometry of the lower patch element's upper metallization is not limited by the lower surface ground plane metallization of the first upper patch element. The inventors have also established design solutions allowing the lower frequency performance of the first, lower patch within a stacked patch antenna to be lowered without compromising the footprint of the resulting antenna.

14 Claims, 8 Drawing Sheets

STACKED PATCH ANTENNA DEVICES AND METHODS

CROSS-REFERENCE TO RELATED APPLICATIONS

This patent application claims the benefit of priority as a continuation of U.S. patent application Ser. No. 17/812,681 filed Jul. 14, 2022; which itself claims the benefit of priority from U.S. patent Ser. No. 16/943,209 filed Jul. 30, 2020 which has issued as U.S. Pat. No. 11,417,961; which itself claims the benefit of priority from U.S. Provisional Patent Application 62/880,237 filed Jul. 30, 2019; the entire contents of each being incorporated herein by reference.

FIELD OF THE INVENTION

This patent application relates to stacked patch antenna elements and more particularly to providing for lower frequency operation for a given size of stacked patch antenna elements and reducing the size of antennas that employ stacked patch antenna elements.

BACKGROUND OF THE INVENTION

Global satellite navigation systems or global navigation satellite systems (GNSS) employ a network of geo-spatially positioned satellites to broadcast precisely synchronized navigation messages, thereby providing for determination of a network time and a geolocation by dedicated GNSS receivers. Such receivers provide for a ubiquitous and global time reference, in addition to a host of geolocation uses, ranging from consumer navigation devices to means to monitor global warming to precision agriculture and of course, military applications.

Modern Global Navigation Satellite Systems (GNSS) receivers are commonly designed and configured to receive signals from multiple constellations, such as the European Galileo, Russian GLONASS, US GPS, and Chinese Beidou Global Navigation Systems, plus at least two regional positioning and timing systems such as the Indian NAVIC and Japanese QZSS systems.

Low cost navigation receivers such as those employed in consumer grade navigators ("SatNav" devices) largely, if not entirely, make use of navigation signals broadcast in the upper GNSS band only (typically the GPS L1 and GLONASS G2 signals). Higher precision positioning systems may also take advantage of navigation signals broadcast in at least two well separated frequency bands to take advantage of predictable signal dispersion to better estimate ionospheric effects, and to thereby improve "fix" accuracy. Further improvements in accuracy of up to an order of magnitude can be achieved by means of Precise Point Positioning (PPP) or 'Real Time Kinematic ('RTK') systems that provide corrections data to compatible receivers to enable carrier phase lock onto individual space vehicle signals. This allows estimation of satellite ranges in measures of carrier wavelengths rather than the plain course acquisition code ("C/A") or similar messages transmitted within most of the new GNSS signals. PPP and RTK corrections systems are commonly referred to as state space and observation space corrections data, respectively, and both rely upon delivery of corrections data through an independent communications channel. RTK corrections primarily rely upon cancellation of common errors between a reference receiver (the Base station) and a roving positioning receiver (the 'Rover'), that are relatively close compared to the signal path length from the satellite. PPP corrections data is used to precisely correct clock and orbital ephemeris data broadcast by each satellite, computed from data received from a distributed network of precision reference receivers installed at precisely known locations, over large geographic regions.

Patch antenna elements are typically square or circular blocks of very low loss dielectric material having a first lower surface fully metalized so as to provide a ground plane, and a second upper surface at least partially metalized, so as to provide a resonant cavity within the dielectric block. Currents associated with electric fields within the cavity are conducted on the metallic surfaces directly in contact with the dielectric block. The element provides for reception or transmission of signals at frequencies at or close to the resonant frequency of the cavity by virtue of fringing fields between the resonant metallization and the ground metallization at the perimeter of the patch antenna element. The current state of the art provides for antenna elements with a circularly polarized response in either rotational sense using symmetrical or near symmetrical dielectric blocks with either a single feed pin or with dual feed pins.

It is also well known in the art that a pair of dielectric blocks metallized to provide different and distinct resonant frequencies, may be "stacked" concentrically or nearly concentrically, one physically upon the other, to provide an antenna element with resonant responses corresponding or close to the resonant frequencies of the two resonant dielectric elements. In this structure, the lower dielectric block has a lower metallization acting as a ground plane, covering most of the lower surface of the lower element, and a resonant metallization pattern covering at least a part of the upper surface of the lower element, to realize a resonant response at a first frequency. The upper dielectric block similarly has a portion of its lower surface metalized to act as a ground plane and a metallization patter resonant metallization covering at least a portion of the upper surface of the upper dielectric block to provide a resonant response at a second frequency. One or more feed pins are commonly used to connect an external feed circuit either to the upper surface of the upper patch alone or to the upper surfaces of both patches. As is well known in the art, the dielectric blocks have physical holes through which the feed pins pass, with openings in the metallization patterns to allow the feed pins to pass through metallization layers not designed to be connected to the feed pins. For stacked patch structures wherein the electrical feed pins are connected to the upper surface metallization of the upper patch antenna element only, coupling to the lower patch antenna element is achieved through near field electromagnetic coupling of the two patch antenna elements.

The stacked dielectric blocks may be equal in size and shape or quite different in both respects, however, to maintain the independence between the first and second resonant response frequencies of the lower and upper patches respectively, it is a requirement, within the prior art, that the dimensions of the ground plane metallization of the upper patch be smaller than, and contained within the perimeter of the resonant metallization of the lower patch, so that the perimeter of the ground plane metallization of the upper block lies entirely within the perimeter of the resonant metallization of the lower block.

Accordingly, in the art it is commonly arranged that the resonant frequency of the upper element correspond to the upper frequency of the two resonances and the resonant frequency of the lower element to that of the lower resonant frequency.

It is also known in the art that the resonant frequency of a dielectric block with a first lower surface metallized as a ground plane and a second upper surface metallized with a resonant pattern may be reduced through castellation of the perimeter of the second upper surface metallization. This allows for the resonant frequency of a patch antenna element to be reduced without increasing the patch antenna element dimensions provided that the castellations are small reductions in the outer dimensions of the resonant metallization of the dielectric block which is otherwise sized to the maximum available dimensions.

These design considerations are particularly important with prior art stacked patch antennas wherein a first patch antenna is mounted on top of a second patch antenna. Provided that the ground plane metallization on the lower surface of upper patch element is smaller than the resonant metallization on the upper surface of the lower element, then the frequencies of the pair of patch antennas may be determined largely independently of each other. Without castellations, the lowest achievable resonant frequency of the lower patch element is limited by the dimensions of the ground plane (lower) metallization on the upper patch element. Any castellation depth applied to the upper resonant metallization of the lower patch to reduce the resonant frequency of the lower patch element is limited to the outer dimensions of the lower ground plane metallization of the upper element, if the two are in contact because the larger metallization size in essence “shorts out” the smaller. Thus, the dimensions of the composite stacked patch element is limited to that required to achieve the desired resonant frequency of the lower patch.

It would be advantageous to provide a structure where the size of the ground plane on the lower surface of the upper patch element is not limited by the geometry of the castellations on the resonant upper metallization of the lower patch element. Alternatively, it would be advantageous to provide a structure whereby the geometry of the castellations on the resonant patch of the upper metallization of the lower patch element is not limited by the ground plane metallization on the lower surface of the first upper patch element. Accordingly, it would be beneficial to provide antenna designers with a design solution allowing the lower frequency performance of the first, lower patch within a stacked patch antenna to be lowered without compromising footprint of the resulting antenna.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art relating to stacked patch antenna elements and more particularly to providing for lower frequency operation for a given size of stacked patch antenna elements and reducing the size of antennas that employ stacked patch antenna elements.

In accordance with an embodiment of the invention there is provided an antenna comprising:

a first patch antenna element comprising a first dielectric body formed from a first dielectric material having a first predetermined geometry comprising a first upper surface with a first metallization on the first upper surface of the first dielectric body having a second predetermined geometry and a distal first lower surface with a second metallization on the distal first lower surface of the first dielectric body having a third predetermined geometry;

a second patch antenna element disposed below the first patch antenna element comprising a second dielectric body formed from a second dielectric material having a fourth predetermined geometry comprising a second upper surface with a third metallization on the second upper surface of the second dielectric body having a fifth predetermined geometry and a distal second lower surface with a fourth metallization on the distal second lower surface of the second dielectric body having a sixth predetermined geometry; and a spacer having a seventh predetermined geometry and a first thickness formed from a third dielectric material; wherein the third metallization on the second upper surface of the second dielectric body is disposed towards the spacer;

the second metallization on the distal first lower surface of the first dielectric body is disposed towards the spacer; and a first predetermined portion of the periphery of the third metallization on the second upper surface of the second dielectric body is within the periphery of the second metallization on the distal first lower surface of the first dielectric body.

In accordance with an embodiment of the invention there is provided a method comprising: providing a first patch antenna element comprising a first dielectric body formed from a first dielectric material having a first predetermined geometry comprising a first upper surface with a first metallization on the first upper surface of the first dielectric body having a second predetermined geometry and a distal first lower surface with a second metallization on the distal first lower surface of the first dielectric body having a third predetermined geometry;

providing a second patch antenna element disposed below the first patch antenna element comprising a second dielectric body formed from a second dielectric material having a fourth predetermined geometry comprising a second upper surface with a third metallization on the second upper surface of the second dielectric body having a fifth predetermined geometry and a distal second lower surface with a fourth metallization on the distal second lower surface of the second dielectric body having a sixth predetermined geometry; and providing a spacer having a seventh predetermined geometry and a first thickness formed from a third dielectric material; wherein the third metallization on the second upper surface of the second dielectric body is disposed towards the spacer;

the second metallization on the distal first lower surface of the first dielectric body is disposed towards the spacer; and a first predetermined portion of the periphery of the third metallization on the second upper surface of the second dielectric body is within the periphery of the second metallization on the distal first lower surface of the first dielectric body.

In accordance with an embodiment of the invention there is provided a method comprising: providing an upper patch antenna element having a first resonant frequency;

providing a lower patch antenna element disposed below the upper patch antenna element having a second resonant frequency; and providing a spacer disposed between the upper patch antenna element and lower patch antenna element; wherein the second resonant frequency of the lower patch antenna element is lower than a resonant frequency defined by an external geometry of the lower patch antenna element.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
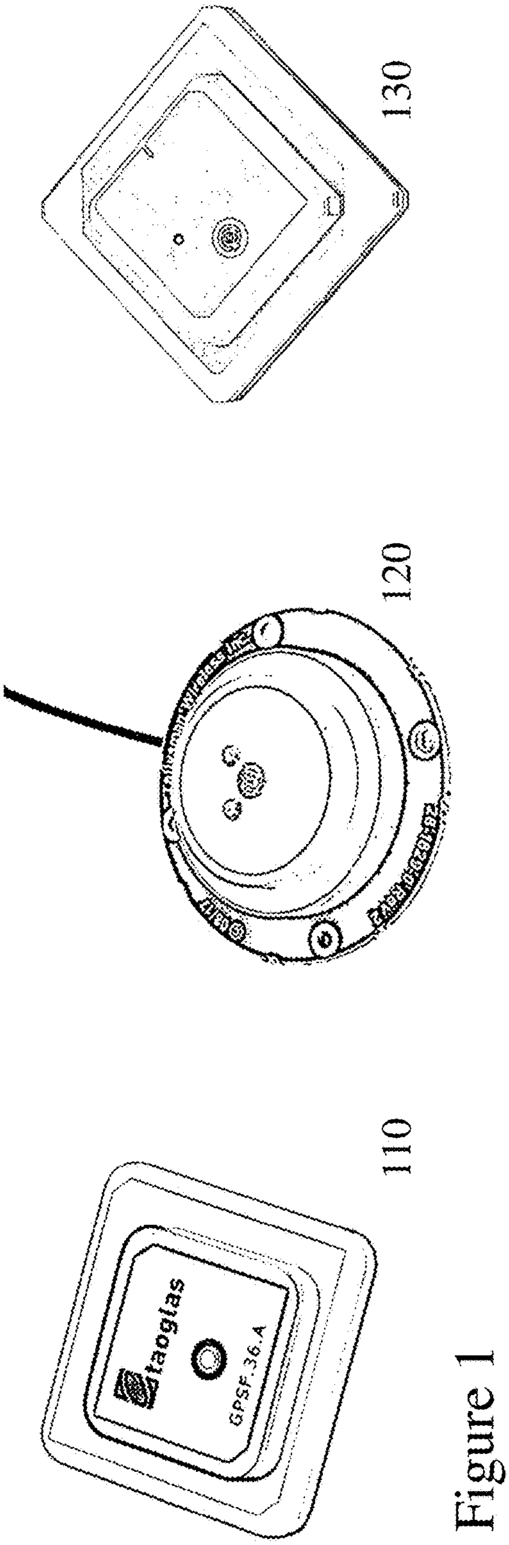
FIG. 1 depicts examples of stacked patch antennas for applications such as global navigation satellite system (GNSS) receivers according to the prior art.

The present invention is directed to stacked patch antenna elements and more particularly to providing for lower frequency operation for a given size of stacked patch antenna elements and reducing the size of antennas that employ stacked patch antenna elements.

The ensuing description provides representative embodiment(s) only, and is not intended to limit the scope, applicability or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purposes only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users.

Reference to terms "including", "comprising", "consisting" and grammatical variants thereof do not preclude the addition of one or more components, features, steps, integers or groups thereof and that the terms are not to be construed as specifying components, features, steps or integers. Likewise, the phrase "consisting essentially of", and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

Reference to terms such as "perpendicular", "along", "parallel" and grammatical variants thereof in respect to alignment and/or direction should be considered not as absolute but as having a tolerance to variation thereof such that these directions and/or alignments are "substantially" as indicated. Tolerances to these being as established, for example, through manufacturing tolerances, performance tolerances, manufacturing costs etc.

As discussed above GNSS receivers are employed within a wide range of applications within both the civil and military markets. Accordingly, these may range from small footprint low cost consumer receivers for smartphones, fitness trackers etc. through to high accuracy high gain receivers specifically designed for timing and/or location. Referring to FIG. 1 there are depicted examples of stacked patch antennas for GNSS application such as position, navigation, and timing applications within applications such as high density cell/telecommunications towers, automobiles, etc. Accordingly, there are depicted in first to third antennas 110 to 130 respectively First image 110 representing a Taoglas GPSF.36.A antenna for GPS L1+L2 operation;

Second image 120 representing a Tallysman Wireless TW1829 providing dual band GPS L1/L2, GLONASS G1/G2, Galileo E1 and Beidou B1 coverage; and Third image 130 representing an INPAQ antenna for GPS L1+L2 operation.

Within most applications the GNSS antenna is housed within a housing or cover, commonly referred to as a radome, which is transparent to wireless signals in the frequencies of interest as listed in Table 1 below. Accordingly, GNSS antennas such as those depicted within first to third images 110 to 130 of FIG. 1 respectively, are designed for use within GPS receivers incorporating an industrial grade weather-proof enclosure which provides options for mounting the GPS receiver as well as typically including a microwave connector or cable interface. Further, these typically contain, in addition to the patch antenna element, a front end microwave circuit for initial processing of the received microwave signal(s). This front end microwave circuit usually comprising a low noise amplifier (LNA), with typical gain between 15 dB and 50 dB, in conjunction with a high rejection low loss filter to reject out-of-band signals (e.g. a surface acoustic wave (SAW) filter).

Figure 2:
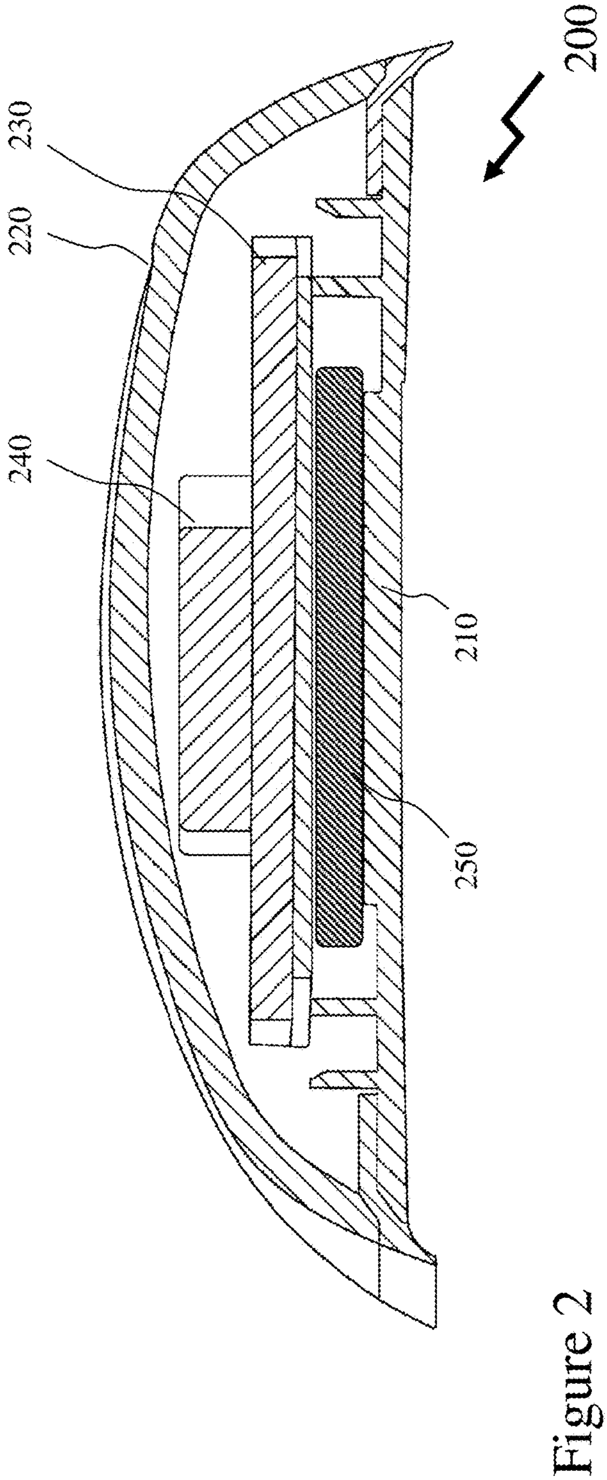
FIG. 2 depicts a cross-section of an exemplary deployment configuration for a stack patch antenna for a GNSS receivers within a low profile antenna housing.

An example of such a radome being depicted within FIG. 2 wherein a radome cover 220 and radome base 210 enclose the stacked patch antenna (comprising lower patch 230 and upper patch 240) and RF front end microwave circuit 250. As is evident, the radome cover 220 and radome base 210 are designed to provide the smallest antenna height and footprint where, in the design depicted, the RF front end microwave circuit 250 is positioned below the stacked patch antenna. Low profile, low weight and smaller footprint are of particular importance for stacked patch antenna, which are commonly used in applications such as Unmanned Aerial Vehicles (UAVs) and for personal tracking, etc.

At present, a dominant configuration for dual band receivers for civilian applications is the use of the L1+L2 bands of the GPS system (formerly Naystar GPS) which is owned by the United States of America government and operated by the United States Air Force since the 1970s for military use and the 1980s for civilian use. The operating frequency bands for GPS L1 and GPS L2 being listed below in Table 1 together with the frequency bands of the other major GNSS systems introduced in the 2000s, namely Beidou, Galileo, GLONASS, GPS, and NAVIC.

TABLE 1

Operating Frequencies of GNSS Systems (Nearest 1 MHz)

| System | Beidou | Galileo | GLONASS |
|---|---|---|---|
| Owner | China | Europe | Russia |
| Freq. | 1.559-1.563 GHz (B1) | 1.164-1.189 GHz (E5a) | 1.593-1.610 GHz (G1) |
| | 1.195-1.210 GHz (B2) | 1.189-1.214 GHz (E5b) | 1.237-1.254 GHz (G2) |
| | 1.256-1.280 GHz (B3) | 1.260-1.300 GHz (E6) | 1.189-1.214 GHz (G3) |
| | | 1.559-1.591 GHz (E1) | |

| System | GPS | NAVIC |
|---|---|---|
| Owner | USA | India |
| Freq. | 1.563-1.587 GHz (L1 signal) | 1.164-1.188 GHz (L5 Band) |
| | 1.215-1.2396 GHz (L2 signal) | 2.483-2.500 GHz (S Band) |
| | 1.164-1.189 GHz (L5 Band) | |

There is an increasing deployment of satellites which also provide a navigation signal on the L5 band. Accordingly, there is also a market drive to replace L1+L2 GPS receivers with L1+L5 GPS receivers. This arises from several factors including, but not limited to:

L5 has about twice as much power as L2;

L5 is within a band designated by the International Telecommunication Union (ITU) for the Aeronautical Radio-Navigation Services (ARNS) and is not prone to interference with ground based navigation aids; and L5 shares frequency space with the E5A signal from Galileo.

Additionally, in 2020 the US Department of Defense will cease to support codeless/semicodeless tracking of GPS L2 signals in favor of a new L2C signal that includes an updated and more refined C/A acquisition signal, transmitted on the existing L2 frequency. The updated GPS signal set includes the new L5 signal which provides an updated C/A signal, and which is broadcast at approximately 3 dB higher EIRP than the L1 and L2 signals. These updates will offer great opportunities to reduce the cost of precision multiband receivers.

Accordingly, there is a requirement to provide L1+L5 stacked patch antennas to meet these evolving requirements either to provide form-fit antennas for retrofitting equipment already deployed allowing them to be upgraded for ongoing L1+L5 operation or to provide form-fit antennas to products in ongoing production to eliminate a requirement for product redesign.

Accordingly, it would be beneficial for the L1+L5 stacked patch antenna to provide the same footprint as the L1+L2 stacked patch antenna. However, as noted from Table 1 the L2 carrier frequency is 1.22760 GHz (wavelength in air 24.45 cm) whilst the L5 carrier frequency is 1.17645 GHz. The diameter of a patch antenna resonant element is inversely proportional to the resonant frequency. Accordingly, the dimensions of an L5 patch antenna are larger than those of an L2 patch antenna which is undesirable. There is significant given demand for reducing antenna footprints generally or providing form-fit replacements in other applications.

Figure 3:
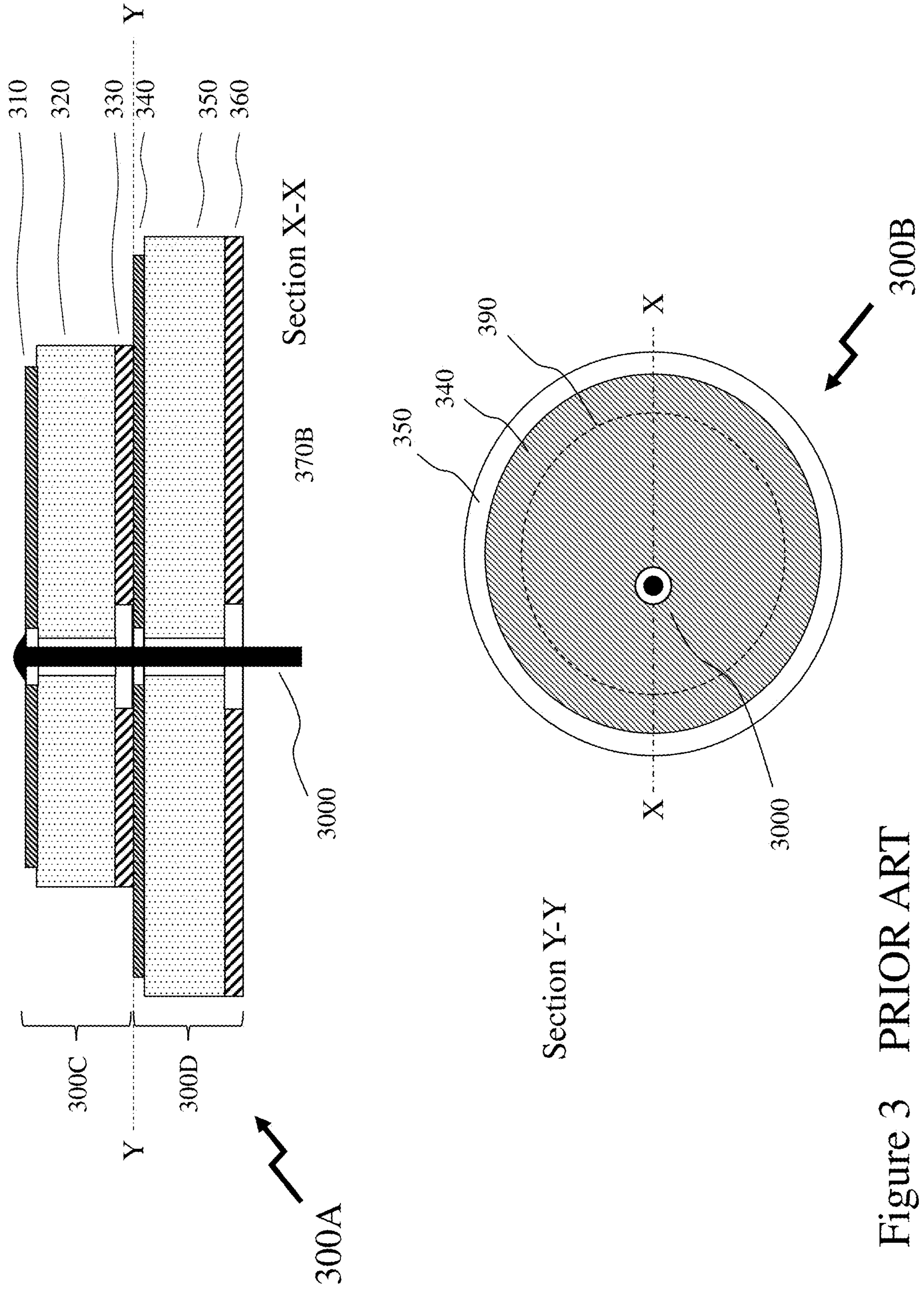
Figure 3 PRIOR ART
FIG. 3 depicts cross-sectional views of an exemplary configuration of a stacked patch antenna according to the prior art.

Referring to FIG. 3 there is depicted a cross-section 300A of a prior art dual band stacked patch antenna (DB-SPA) along a section X-X together with a cross-sectional plan view 300B of the dual band stacked patch antenna along a section Y-Y. Within cross-section 300A an upper patch antenna element 300C is depicted in conjunction with lower patch antenna element 300D. Upper patch antenna element 300C comprising first upper metallization 310, first dielectric 320, and first lower metallization 330. Lower patch antenna element 300D comprising second upper metallization 340, second dielectric 350, and second lower metallization 360. Also depicted is RF feed 3000 which is coupled to the first upper metallization 310 and second upper metallization 340 by overlapping near-field responses. As depicted within cross-sectional plan view 300B the periphery 390 of the upper patch as depicted by the dashed circle. The dashed circle depicting the periphery 390 is within the second upper metallization 340 on the second dielectric 350.

Accordingly, the microwave signals at the lower frequency of the lower patch antenna element 300D propagate around the periphery of the second upper metallization 340 unimpeded by the ground plane on the upper patch antenna element 300C formed by the first lower metallization 330.

Figure 4:
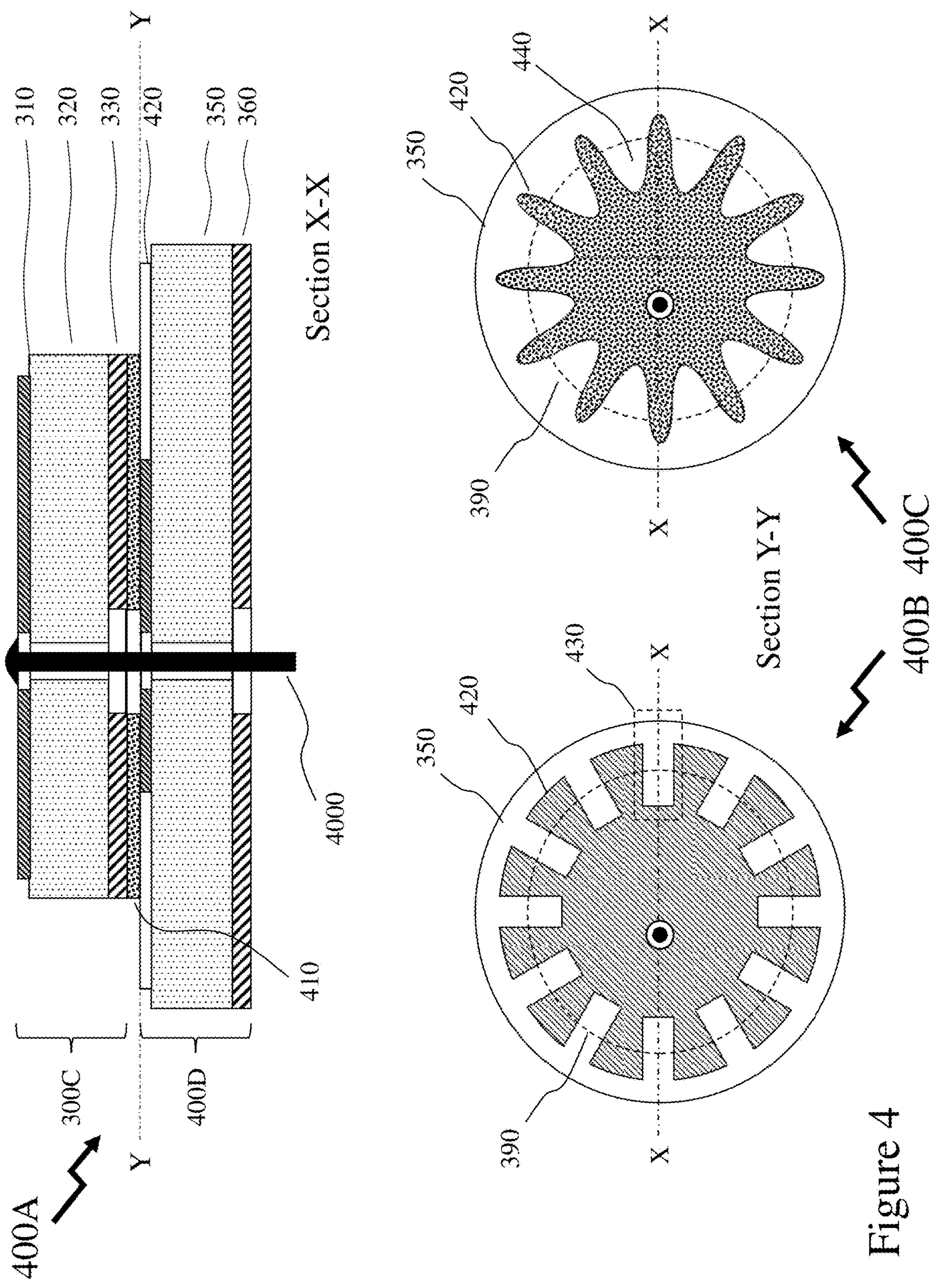
FIG. 4 depicts cross-sectional views of an exemplary configuration for a stacked patch antenna according to embodiments of the invention.

Referring to FIG. 4 there is depicted a cross-section 400A of a dual band stacked patch antenna (DB-SPA) according to an embodiment of the invention along a section X-X together with first and second cross-sectional plan views 400B and 400C of the lower patch antenna elements along a section Y-Y. Within each of the first and second plan views 400B and 400C the second dielectric 350 is again depicted together with the periphery 390 of the first dielectric 320 of the upper patch antenna element 300C, as depicted by the dashed circles. However, now the upper metallization 420 of the lower antenna element 400D has a geometrically varying periphery comprising castellations defined by first and second notches 430 and 440 respectively in the first and second cross-sectional plan views 400B and 400C respectively. The increased length of the periphery of the upper metallization 420 of antenna 400D results in a lower resonant frequency for the lower antenna element 400D. However according to prior art, the first lower metallization 330 of the upper element 300C cannot project beyond the geometrically varying periphery of the immediately adjacent second upper metallization 420, otherwise the castellations would effectively be shorted in an electromagnetic sense by first lower metallization 330, thereby rendering the castellations of the second upper metallization 420 ineffective. As such the lowest frequency that the lower patch antenna element 400D could resonate is defined by the overlap of the first lower metallization 330 of the upper patch antenna element 300C over the upper metallization 420 of the lower antenna element 400D rather than the periphery of the upper metallization 420 of the lower antenna element 400D alone. Also depicted is RF feed 4000 which is coupled to the first upper metallization 310 and second upper metallization 420 via overlapping near-field responses. Whilst the upper patch antenna element 300C is depicted in FIG. 4 as having a smaller diameter than the lower patch antenna element 400D its diameter may be increased towards that of the lower patch antenna element 400D, equal to the lower patch antenna element 400D, or larger than the lower patch antenna element 400D.

Accordingly, the inventors provide a spacer 410 having a dielectric constant lower than either of the dielectric constants of upper element 300C and 400D, disposed between the upper element 300C and the lower element 400D. By this means the microwave signals propagating within lower element 400D and flowing on second upper metallization 420 are decoupled from first lower metallization 330. Accordingly, the geometrically varying periphery comprising castellations defined by first and second notches 430 and 440 respectively in the first and second plan views 400B and 400C respectively can now extend under the upper patch antenna element 300C allowing the lower patch antenna element 400D to operate at lower frequencies than prior art DB-SPAs. The coupling between the microwave signals propagating within the upper metallization 420 of the lower patch antenna element 400D to the upper patch antenna element being reduced to below a threshold such that the resonant frequency of the lower patch antenna element is determined by the cavity resonator comprised of the castellated upper metallization 420 and the ground plane metallization 360 of the second dielectric 350. The dielectric spacer 410 is manufactured from a material having a lower effective dielectric constant so that the decoupling between the lower metallization 330 of the upper patch antenna element 300C and upper metallization 420 of the lower patch antenna element 400D is achieved for a small or low thickness of the dielectric spacer 410.

Figure 5:
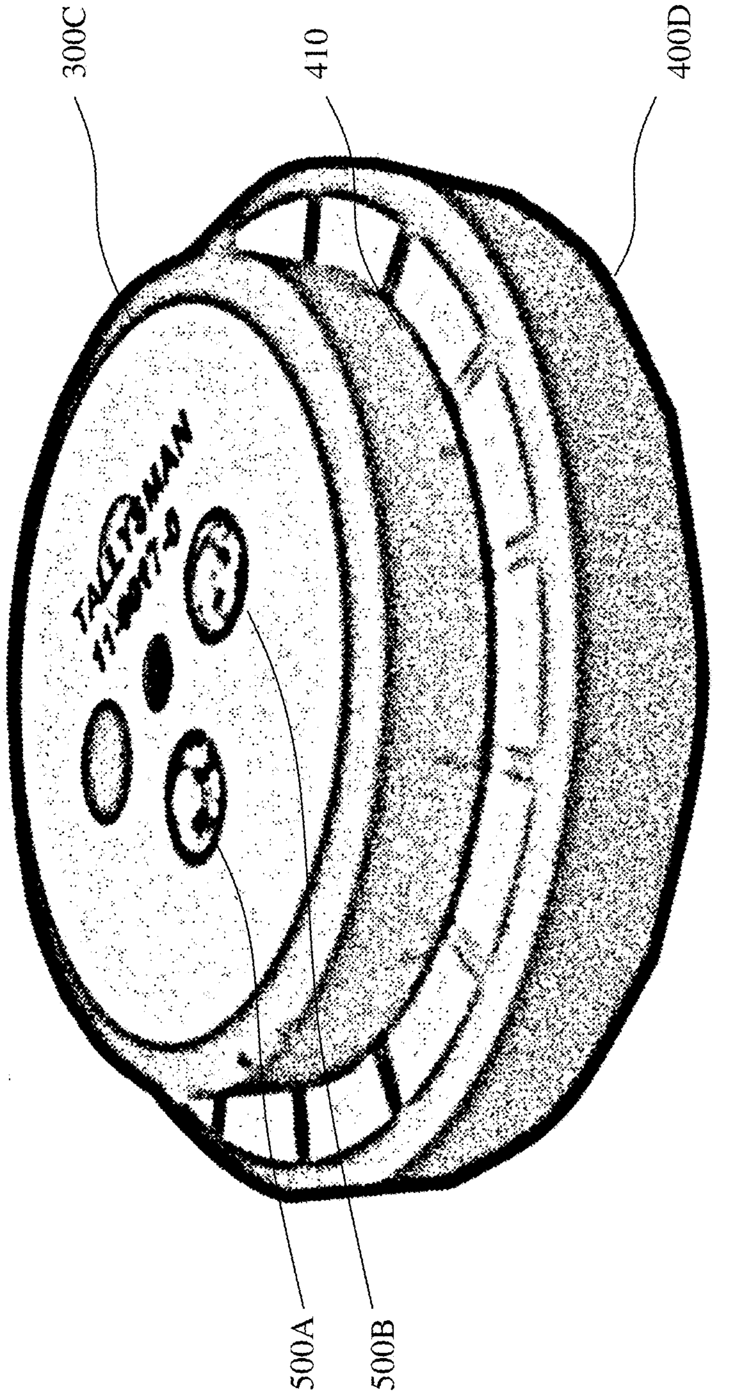
FIG. 5 depicts images of stacked patch antennas according to an embodiment of the invention.
Figure 6:
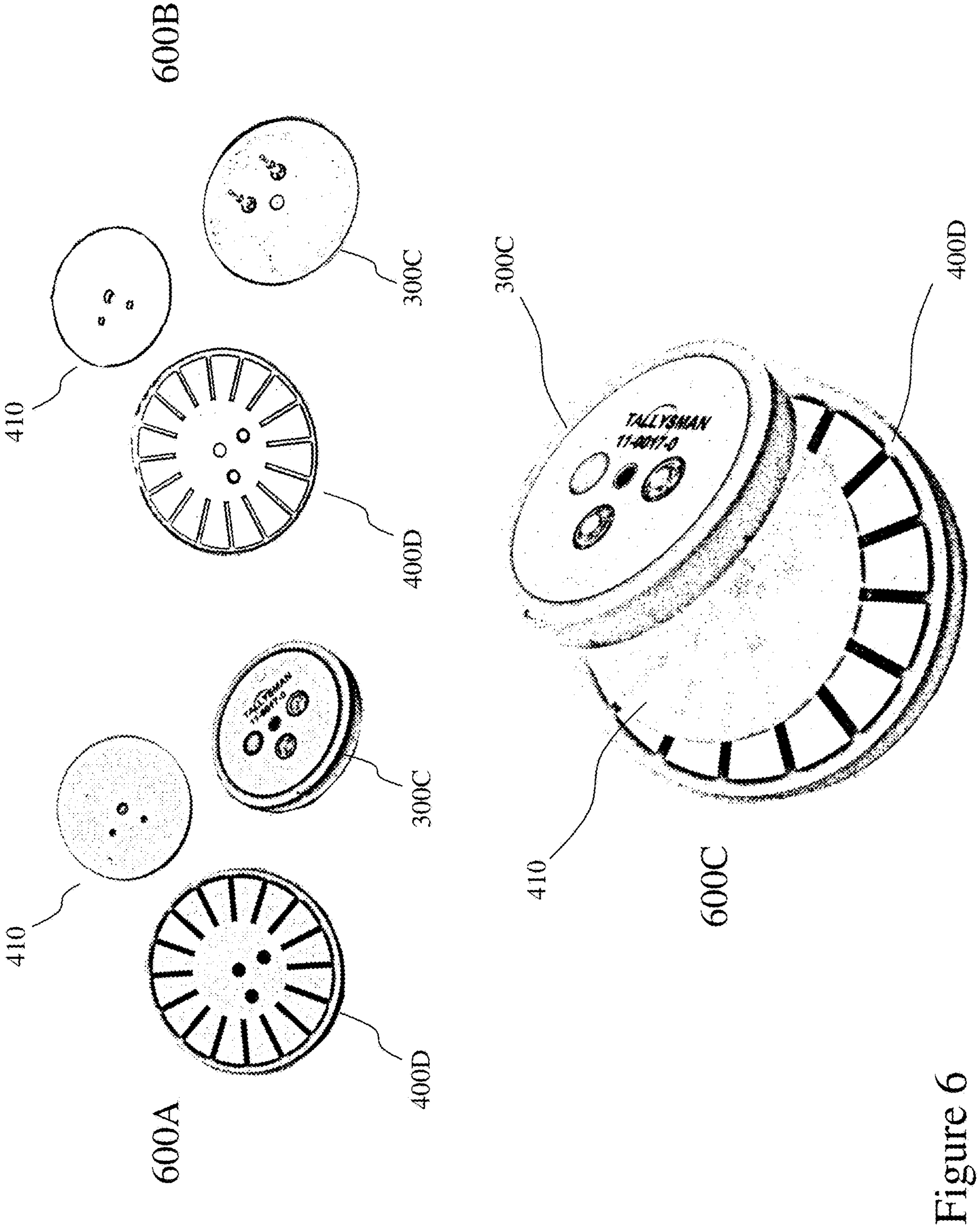
FIG. 6 depicts images of the components of a stacked patch antenna according to an embodiment of the invention.

Referring to FIG. 5 there is depicted an assembled DB-SPA according to an embodiment of the invention denoting the upper patch antenna element 300C, lower patch antenna element 400D, with the spacer 410, which is not evident. In FIG. 6 there are depicted first to third images 600A to 600C of the DB-SPA elements according to an embodiment of the invention. In first image 600A the upper surface of the lower patch antenna element 400D is depicted together with the upper surface of the upper patch antenna element 300C and spacer 410. In second image 600B the upper patch antenna element 300C is now depicted upside down so that the ground plane can be seen on the lower surface. In third image 600C the lower patch antenna element 400D is depicted with the spacer 410 and upper patch antenna element 300C atop it during assembly.

It would be evident from first to third images 600A to 600C respectively and FIG. 5 that the DB-SPA as depicted has a pair of electrical feeds, these being identified in FIG. 5 as first and second feeds 500A and 500B respectively. Accordingly, signals coupled to/from the DB-SPA via first and second feeds 500A and 500B respectively are in quadrature with respect to one another for circularly polarized signals.

Figure 7:
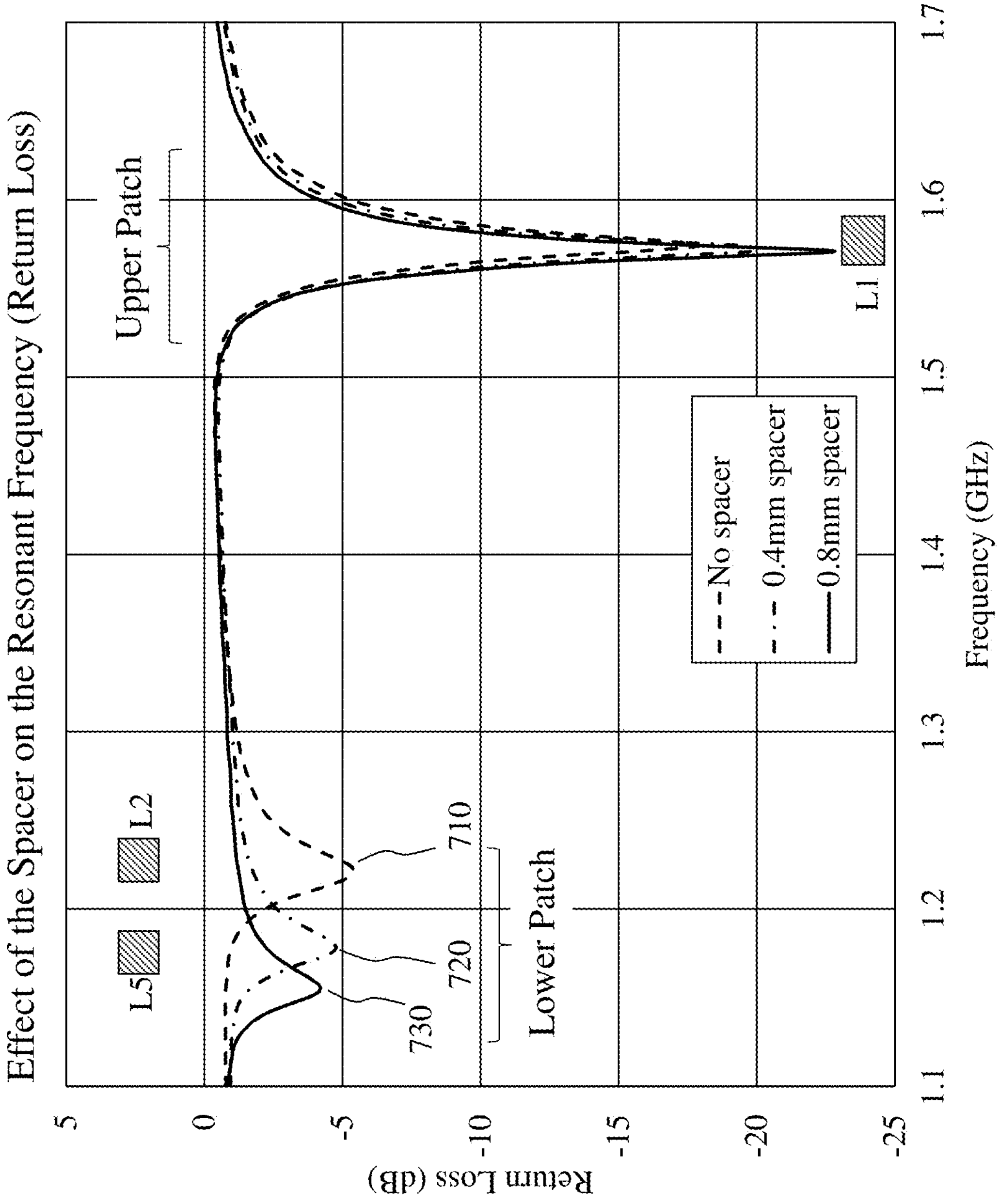
FIG. 7 depicts effect of spacer on resonant frequency as observed via microwave return loss for stacked patch antennas according to an embodiment of the invention.

Referring to FIG. 7 there are depicted first to third curves 710 to 730 respectively are depicted over the frequency range 1.1 GHz-1.7 GHz for a DB-SPA designed with an upper patch antenna element operating within the GPS L1 band and a lower patch antenna element employing a “castellated” periphery designed to operate within the GPS L5 band. First curve 710 representing the scenario where no spacer is employed whereas second and third curves 720 and 730 respectively represent the use of spacers with increasing thicknesses respectively. Also depicted are the L1, L2, and L5 bands for the GPS GNSS system. Accordingly, as expected the spacer has minimal effect upon the L1 response for the upper patch antenna element but the frequency response of the lower element shifts to lower frequencies with increasing spacer thickness as the effect of the lower ground metallization of the upper patch antenna element is reduced. The use of high dielectric materials for the dielectric of the upper and lower patch antennas reduces the required patch element dimensions and results in the electric lines of force being confined within the patch antennas. Accordingly, decoupling of the upper patch antenna from the lower patch antenna with the low dielectric constant spacer does not degrade the near field coupling of the patch antennas to the microwave feed or feeds.

Figure 8:
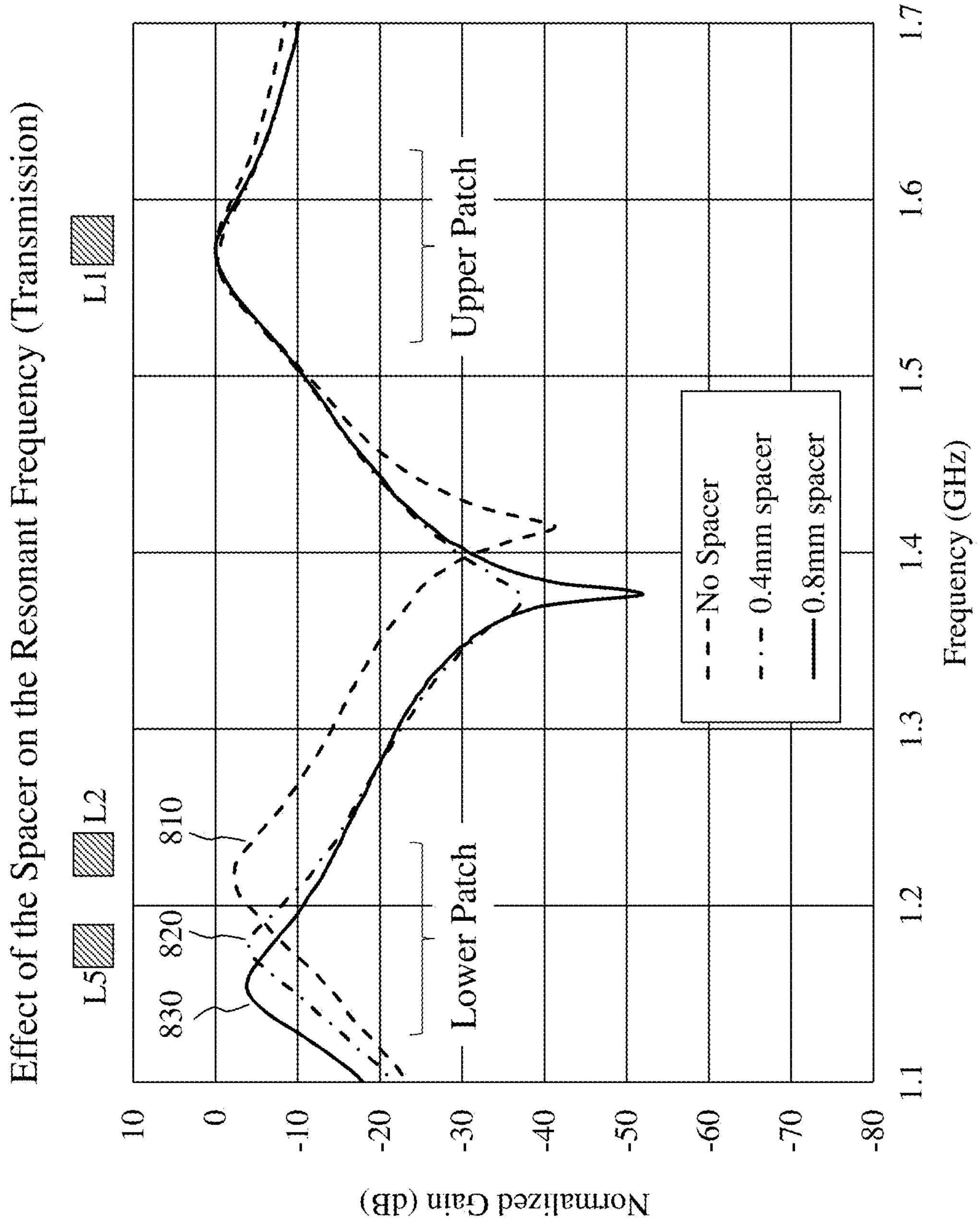
FIG. 8 depicts effect of spacer on resonant frequency as observed via microwave transmission for stacked patch antennas according to an embodiment of the invention.

A similar situation is evident in FIG. 8 wherein there are depicted first to third curves 810 to 830 respectively over the frequency range 1.1 GHz-1.7 GHz for a DB-SPA designed with an upper patch element operating within the GPS L1 band and a lower patch antenna element employing a “castellated” periphery designed to operate within the GPS L5 band. First curve 810 representing the scenario where no spacer is employed whereas second and third curves 820 and 830 respectively represent the use of spacers with increasing thickness. Also depicted are the L1, L2, and L5 bands for the GPS GNSS system. Accordingly, as expected the spacer has minimal effect upon the L1 response for the upper patch antenna element but the frequency response of the lower element shifts to lower frequencies with increasing spacer thickness as the effect of the lower metallization of the upper patch antenna element is reduced.

Within the descriptions supra in respect of FIGS. 4 to 8 the DB-SPA according to embodiments of the invention has been described and depicted as being circular. However, it would be evident that within other embodiments of the invention the geometry of either the upper patch antenna element and/or lower patch antenna element may be non-circular and have a geometry such as elliptical, square, rectangular, a regular polygon, an irregular polygon, and an arbitrary geometry. Optionally, the geometry of the upper patch antenna element and lower patch antenna element may be the same, e.g. both square, or they may be dissimilar, e.g. a square upper patch antenna element with a rectangular lower patch antenna element.

Figure 9:
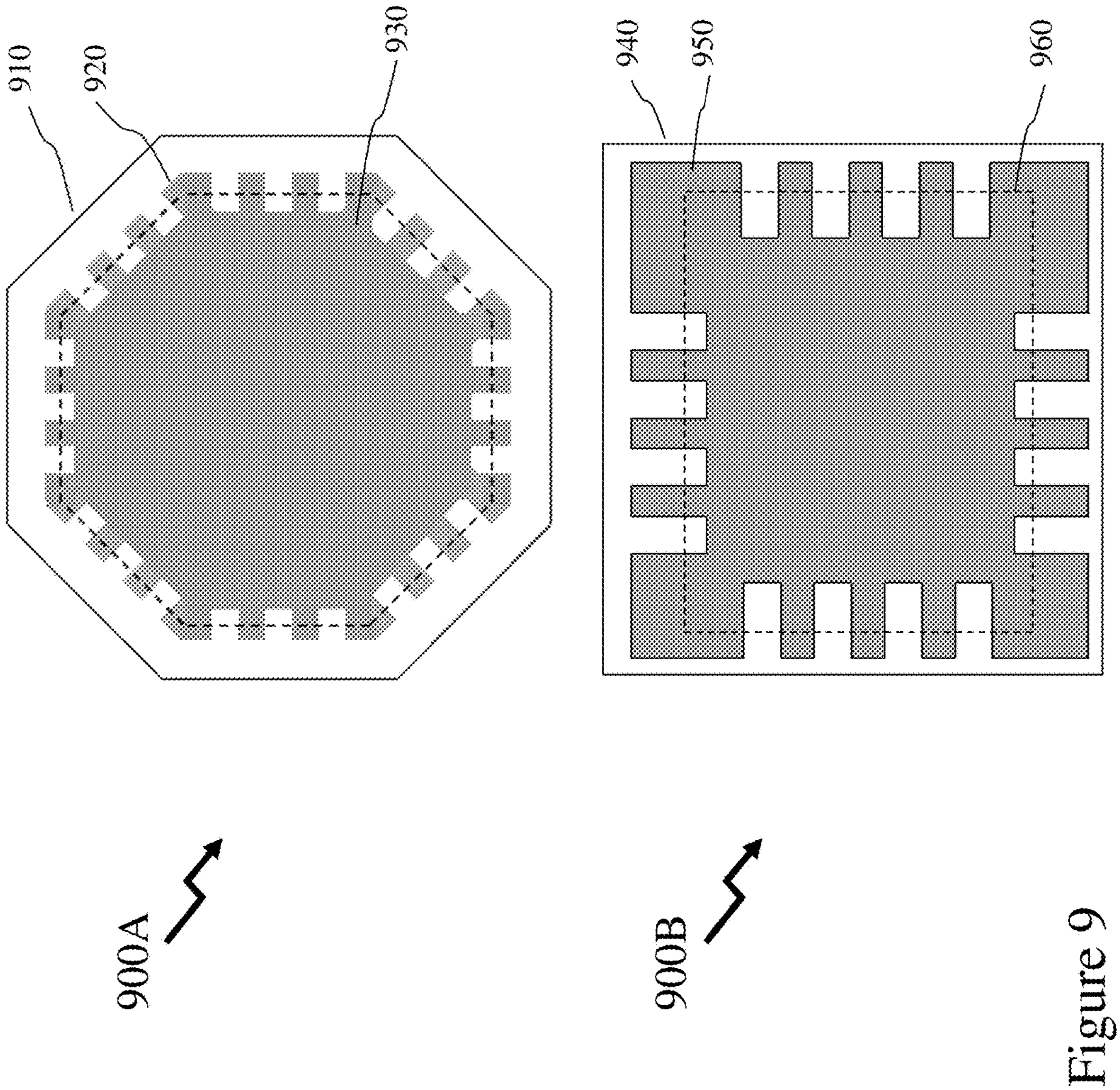
FIG. 9 depicts examples of upper and lower patch antenna elements employing non-circular patch antenna elements.

Two examples being depicted in FIG. 9 in first and second images 900A and 900B respectively. In FIG. 9 in first image 900A the lower patch antenna element body 910 is depicted together with its upper surface metallization 920 and the footprint of the upper patch antenna element by line 930. In this instance each of the lower patch antenna element and upper patch antenna element are octagonal. In contrast within second image 900B the lower patch antenna element body 940 is depicted as square together with its upper surface metallization 950 whilst the footprint of the upper patch antenna element denoted by line 960 is rectangular. As depicted the "castellations" on the upper surface metallization 950 in this instance extend to different "depths" within the footprint of the upper patch antenna element on two sides of the lower patch antenna element versus the other two sides. Optionally, within other embodiments of the invention the "castellations" may have a single "depth" or multiple depths. The patch antenna elements depicted in first and second images 900A and 900B are circularly symmetric for use with circularly polarized signals. However, within other embodiments of invention with non-circularly polarized signals the patch antenna elements may be non-circularly symmetric.

Specific details are given in the above description to provide a thorough understanding of the embodiments. However, it is understood that the embodiments may be practiced without these specific details.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

What is claimed is:

1. An antenna comprising:

an upper antenna element comprising a first metallization layer and a first ground plane disposed below the first metallization layer where the upper patch antenna element has a first resonant frequency established in dependence upon a periphery of the first metallization layer;

a lower antenna element comprising a second metallization layer and a second ground plane disposed below the second metallization layer where the lower antenna element has a second resonant frequency established in dependence upon a periphery of the first metallization layer; and a spacer disposed between the first ground plane of the upper antenna element and the second metallization layer of the lower antenna element; wherein the electrical path of an electrical signal at the second resonant frequency traverses a path within the periphery of the second metallization layer that is longer than the periphery of the lower antenna element and comprises a portion within the footprint of the first ground plane.

2. The antenna according to claim 1, wherein the second resonant frequency is lower than the first resonant frequency.

3. The antenna according to claim 1, wherein a second predetermined portion of the periphery of the second metallization layer is outside the periphery of the first ground plane.

4. The antenna according to claim 1, wherein the periphery of the second metallization layer comprises a plurality of castellations each castellation defined by a notch within the second metallization layer;

each notch extends from the periphery of the second metallization layer towards the centre of the second metallization layer;

a first portion of each notch is outside the footprint of the first ground plane; and a second portion of each notch is inside the footprint of the first ground plane.

5. A method comprising:

providing an upper antenna element comprising a first metallization layer and a first ground plane disposed below the first metallization layer where the upper patch antenna element has a first resonant frequency established in dependence upon a periphery of the first metallization layer;

providing a lower antenna element comprising a second metallization layer and a second ground plane disposed below the second metallization layer where the lower antenna element has a second resonant frequency established in dependence upon a periphery of the first metallization layer; and providing a spacer disposed between the first ground plane of the upper antenna element and the second metallization layer of the lower antenna element; wherein the electrical path of an electrical signal at the second resonant frequency traverses a path within the periphery of the second metallization layer that is longer than the periphery of the lower antenna element and comprises a portion within the footprint of the first ground plane.

6. The antenna according to claim 5, wherein the second resonant frequency is lower than the first resonant frequency.

7. The antenna according to claim 5, wherein a second predetermined portion of the periphery of the second metallization layer is outside the periphery of the first ground plane.

8. The antenna according to claim 5, wherein the periphery of the second metallization layer comprises a plurality of castellations each castellation defined by a notch within the second metallization layer;

each notch extends from the periphery of the second metallization layer towards the centre of the second metallization layer;

a first portion of each notch is outside the footprint of the first ground plane; and a second portion of each notch is inside the footprint of the first ground plane.

9. An assembly to extend a single band antenna comprising a first antenna operating at a first resonant frequency to a dual band antenna operating at the first resonant frequency and a second resonant frequency comprising:

a second antenna comprising a first metallization layer and a first ground plane disposed below the first metallization layer where the second resonant frequency of the second antenna is established in dependence upon a periphery of the first metallization layer; and a spacer disposed between a second metallization layer of the first antenna and the first ground plane of the second antenna; wherein the electrical path of an electrical signal at the first resonant frequency traverses a path within the periphery of the second metallization layer that is longer than the periphery of the first antenna and comprises a portion within the footprint of the first ground plane.

10. The assembly according to claim 9, wherein the second resonant frequency is higher than the first resonant frequency.

11. The assembly according to claim 9, wherein a second predetermined portion of the periphery of the second metallization layer is outside the periphery of the first ground plane.

12. The assembly according to claim 9, wherein the periphery of the second metallization layer comprises a plurality of castellations each castellation defined by a notch within the second metallization layer;

each notch extends from the periphery of the second metallization layer towards the centre of the second metallization layer;

a first portion of each notch is outside the footprint of the first ground plane; and a second portion of each notch is inside the footprint of the first ground plane.

13. The assembly according to claim 9, wherein the first resonant frequency of the first antenna assembled with the second antenna is lower than the operating frequency of the first antenna discretely.

14. The assembly according to claim 9, wherein the first resonant frequency of the first antenna assembled with the second antenna is lower than a third resonant frequency of the first antenna discretely; and the reduction in operating frequency of the first antenna from the third resonant frequency of the discrete first antenna to the first resonant frequency of the first antenna assembled with the second antenna and spacer varies according to the thickness of the spacer.

* * * * *